April 21, 1970 S. P. DANIELSEN ET AL 3,508,136
APPARATUS FOR OBTAINING A CARRIER FREQUENCY SHIFTING AT A CONSTANT PHASE ANGLE IN FREQUENCY MODULATION
Filed Oct. 12, 1967
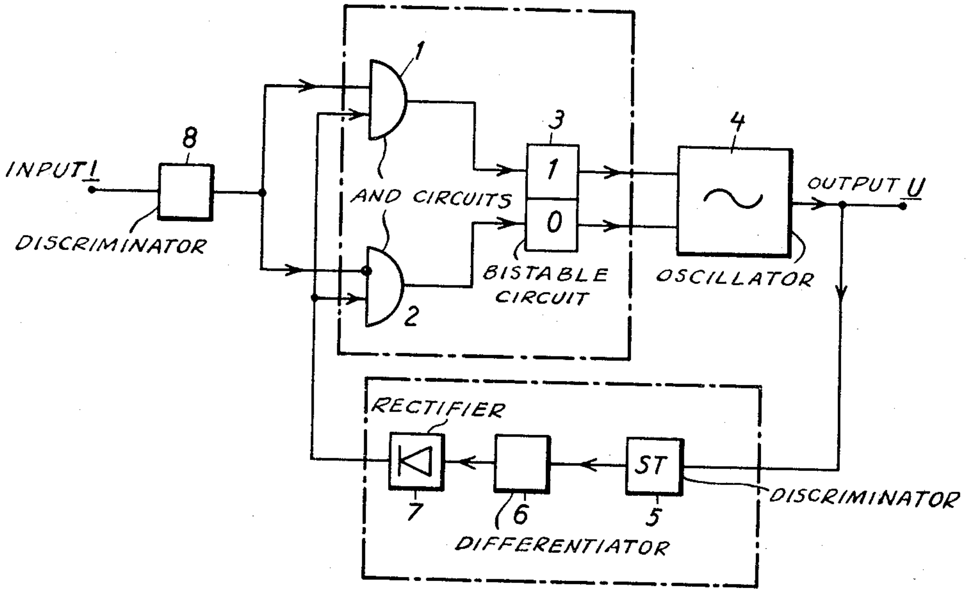
INVENTORS
Sigurd Pareli Danielsen
Jan-Erik Hagen
Walter Herbert Erwin Widl
BY Hane and Baxley
ATTORNEYS United States Patent Office 3,508,136

Patented Apr. 21, 1970

3,508,136

APPARATUS FOR OBTAINING A CARRIER FREQUENCY SHIFTING AT A CONSTANT PHASE ANGLE IN FREQUENCY MODULATION

Sigurd Pareli Danielsen, Bandhagen, Jan-Erik Hagen, Farsta, and Walter Herbert Erwin Widl, Bandhagen, Sweden, assignors to Telefonaktiebolaget L M Ericsson, Stockholm, Sweden, a corporation of Sweden Filed Oct. 12, 1967, Ser. No. 674,912
Claims priority, application Sweden, Dec. 12, 1966, 16,987/66
Int. Cl. H04l *27/10;* H03c *3/00*
U.S. Cl. 332—14 5 Claims

ABSTRACT OF THE DISCLOSURE

There is disclosed a distortion-free transmitter which receives amplitude modulated signals representing binary digital information and transmits frequency modulated carrier signals switching between two frequencies in accordance with the binary digital information.

The amplitude modulated signals are fed in opposite phases to inputs of two AND-gates the outputs of which are fed to the set and clear terminals of a bistable switching circuit which controls a frequency shift oscillator. The output of the oscillator is fed back via an amplitude sensitive pulse generator to other inputs of the AND-gates to control the passage of the amplitude modulated signals through the AND-gates. Consequently, the time of switching of the bistable circuit and, therefore, the frequency switching of the oscillator are controlled to occur at a particular phase of the carrier signals generated by the oscillator.

The present invention refers to an apparatus for causing carrier frequency shifting at a constant phase angle, when digital information is transmitted by frequency modulation techniques, whereby every digital value is represented by a discrete carrier frequency.

When digital information is transmitted by frequency modulation techniques, every digital value of the modulating signal corresponds to a discrete carrier frequency and a shifting of the digital value corresponds to a carrier frequency shifting. Every digital value will consequently be represented by a determined number of periods of a given carrier frequency signal. Such a time limited signal has a frequency spectrum which includes a great number of frequencies, the carrier frequency component having the greatest amplitude. This amplitude changes in accordance with the phase angle at which the carrier frequency signal is started and stopped. This amplitude change will increase when the number of emitted periods within every digital time slot decreases. Since the value of the digital information is shifted at an arbitrary phase angle of the carrier frequency signal, carrier frequency signals with various amplitude values will be received by the receiver, causing distortion therein.

An object of the invention is to eliminate such distortion.

Briefly, the invention contemplates continuously detecting the level of the emitted carrier frequency signal and generating a pulse each time a given level defining a given phase angle is passed in a given direction. These pulses are used for controlling signals representing the digital information in such a way that a shifting of the digital value can only effect a carrier frequency signal shifting at the given phase angle.

Apparatus for realizing the invention includes a carrier frequency oscillator which can alternatively generate carrier frequency signals with the same amplitude at a number of different frequencies; a control pulse generating circuit which emits a controlling pulse each time the carrier frequency signal from the oscillator passes a given level in a given direction; and a logic circuit to which are supplied firstly the controlling pulses and secondly the digital-information-representing signals, hereinafter called digital signals, which are to be transmitted. The logic circuit includes switch means for effecting an adjustment of the oscillator to a given frequency dependent on each of the digital signals.

The invention will be more fully described by means of the embodiment shown in the accompanying drawing which is a block diagram of apparatus for realizing the invention.

Reference number I indicates the input of the arrangement to which the modulating digital signal is supplied. In accordance with the example this signal is presumed to be able to have two alternative values which are represented by two different voltages. Only one of these two voltages causes an output signal from a discriminator 8, while the other one does not. The output signal from the discriminator 8 is used for operating an oscillator 4 which, dependent on the digital value, generates one of two possible carrier frequencies. Without the use of the present invention the frequency shiftings would appear at arbitrary phase angles of the carrier signal which would cause great amplitude variations as heretofore mentioned. According to the invention the output U of the oscillator 4, which output is the output of the arrangement, is connected to a discriminator 5, for example a Schmitt-trigger. The output voltage of the discriminator shifts between two values as the signal from the oscillator 4 passes a given level. Since the two carrier frequency signals which can occur at the output of the oscillator 4 must have the same amplitude, this level will be passed at the same phase angle for both frequencies. The output signal from the discriminator 5 is differentiated in a differentiator 6, from which pulses with shifting polarities are obtained when the voltage of the output of the discriminator shifts. Of these pulses every second pulse is eliminated by means of a rectifier 7. The output pulses from the rectifier 7 are control pulses used for controlling the oscillator 4 by means of the AND-circuits 1 and 2. Each of the AND-circuits has two inputs, one of which receives the input signal from a discriminator 8 and the other one receives the control pulses. The input of the AND-circuit 2 which receives the input signal is an inverting input. Consequently, the control pulses will pass through the AND-circuit 1 when an output signal from the discriminator 8 represents one of the digital values, while the pulses will pass through the AND-circuit 2 when no signal is received from the discriminator 8, representing the other digital value. The output pulses from the AND-circuits 1 and 2 are supplied to triggering inputs of a bistable circuit 3. The bistable circuit 3 can be a flip-flop having a "set-to-one" input connected to the output of AND-gate 1, and a "set-to-zero" input connected to the output of AND-gate 2. Bistable circuit 3, depending on which the input is activated, assumes one of its stable positions and supplies a signal to the carrier frequency oscillator 4. The carrier frequency oscillator 4 then transmits the corresponding carrier frequency. Accordingly, the shifting of the carrier frequency always takes place at the same phase angle due to the fact that a change in the condition of the bistable circuit can take place only when a control pulse from the rectifier 7 occurs. This occurs at a determined level of the carrier frequency signal occurring on the output U. In this way the carrier frequency signal amplitude in the emitted frequency spectrum will be constant whereby the distortion mentioned in the introduction is eliminated.

The invention is of course not limited to the disclosed embodiment, but it is possible to apply it to the transmission of more than two alternative signals, the only differences being that the carrier frequency oscillator should be able to generate a required number of frequencies and that the number of AND-circuits and bistable circuits will be selected in a corresponding way.

We claim:

1. Apparatus for transmitting carrier signals shifting between at least two frequencies in accordance with digital information signals shifting between at least two values wherein the frequency shifting occurs at a constant phase angle of the carrier signals, said apparatus comprising in combination:

receiving means adapted to receive the digital information signals;

an osillator means for generating constant amplitude carrier signals switchable between at least two frequencies in accordance with characteristics of received control signals;

control means connected to said receiving means for generating said control signals having said characteristics in accordance with the values of the digital information signals;

means for connecting said control means to said oscillator means whereby said control signals are transmitted to said oscillator means; and sensing means connected to said oscillator means for sensing for the passage of said carrier signals through a given amplitude in a given direction, said sensing means being further connected to said control means for controlling the times of transmission of said control signals in accordance with the times of passage of said carrier signals through a given amplitude in a given direction whereby said carrier signals are always switched at the same phase angle.

2. The apparatus of claim 1 wherein said control means comprises logic means connected to said sensing means and said receiving means for generating switching control signals the timing of which is controlled by said sensing means, and multistable switching means connected to said logic means and receiving said switching control signals for switching to different stable states and generating said control signals having said characteristics in accordance with the values of the digital information signals.

3. The apparatus of claim 1 wherein said sensing means includes means for generating a control pulse each time the carrier signals pass through said given amplitude in said given direction.

4. The apparatus of claim 3 wherein said control means comprises logic means including first input means for receiving the digital information signals from said receiving means and second input means for receiving said control pulses, said logic means emitting switching signals timed with said control pulses, and switching means connected to said logic means and responsive to said switching signals for generating said control signals having said characteristics in accordance with the values of the digital information signals.

5. The apparatus of claim 4 wherein said logic means includes AND-circuits and said switching means is a multistable state switching device.

References Cited

UNITED STATES PATENTS

| | | | |
|---|---|---|---|
| 3,160,812 | 12/1964 | Scantlin | 325—30 |
| 3,328,724 | 6/1967 | Way | 332—14 X |
| 3,408,572 | 10/1968 | Wolf et al. | 332—14 X |

ALFRED L. BRODY, Primary Examiner

U.S. Cl. X.R.

178—66; 325—30, 163; 332—19